(12) United States Patent
Kim et al.

(10) Patent No.: US 8,395,856 B2
(45) Date of Patent: Mar. 12, 2013

(54) SERVO PATTERN ERASING METHOD AND APPARATUS OF HARD DISK DRIVE

(75) Inventors: Ha Yong Kim, Seoul (KR); Dong Ho Oh, Seoul (KR); Chul Woo Lee, Seongnam-si (KR)

(73) Assignee: Seagate Technology International, Grand Cayman (KY)

( * ) Notice: Subject to any disclaimer, the term of this patent is extended or adjusted under 35 U.S.C. 154(b) by 127 days.

(21) Appl. No.: 12/759,764

(22) Filed: Apr. 14, 2010

(65) Prior Publication Data
US 2010/0265613 A1    Oct. 21, 2010

(30) Foreign Application Priority Data

Apr. 16, 2009  (KR) .............................. 2009-0033314

(51) Int. Cl.
*G11B 27/36* (2006.01)
*G11B 21/02* (2006.01)

(52) U.S. Cl. .......................................... 360/31; 360/75
(58) Field of Classification Search ........................ None
See application file for complete search history.

(56) References Cited

U.S. PATENT DOCUMENTS

| | | | | |
|---|---|---|---|---|
| 5,612,602 A | * | 3/1997 | Kubota et al. | 318/560 |
| 6,040,963 A | * | 3/2000 | Rothermel | 360/118 |
| 6,304,398 B1 | * | 10/2001 | Gaub et al. | 360/49 |
| 6,507,450 B1 | | 1/2003 | Elliott | |
| 6,992,851 B1 | * | 1/2006 | Cloke | 360/75 |
| 2007/0247741 A1 | * | 10/2007 | Akagi et al. | 360/75 |
| 2008/0002279 A1 | * | 1/2008 | Kouhara et al. | 360/75 |
| 2009/0168226 A1 | * | 7/2009 | Herbst et al. | 360/77.04 |
| 2009/0185305 A1 | * | 7/2009 | Cho et al. | 360/31 |

FOREIGN PATENT DOCUMENTS

| | | | |
|---|---|---|---|
| JP | 58115661 A | * | 7/1983 |
| JP | 2008-010101 | | 1/2008 |
| KR | 100652436 | | 11/2006 |
| KR | 100736409 | | 6/2007 |

* cited by examiner

*Primary Examiner* — Regina N Holder
(74) *Attorney, Agent, or Firm* — HolzerIPLaw, PC

(57) ABSTRACT

A method of erasing a servo pattern of a hard disk drive includes reading a servo pattern recorded on a disk, generating an erase pattern to erase the servo pattern based on the servo pattern obtained in the reading of the servo pattern, and erasing the servo pattern by using the erase pattern while the disk is rotated. The servo pattern recorded on the hard disk drive may be uniformly erased. Also, a stabilization time to stabilize a read/write head after the position control of the read/write head that is needed when a servo writer is used may be avoided so that a time to erase a servo pattern may be reduced.

20 Claims, 13 Drawing Sheets

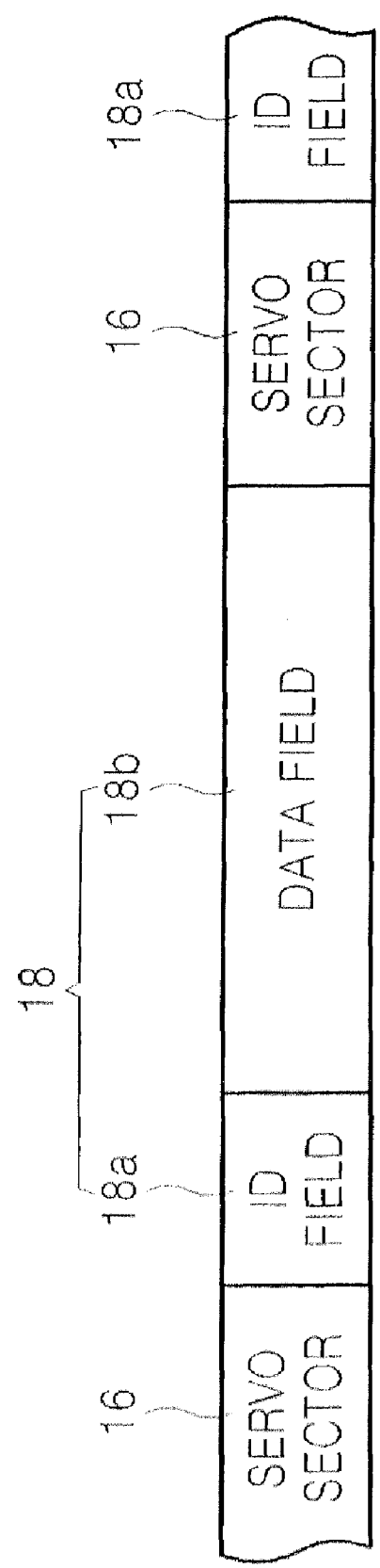

SERVO PATTERN ERASING METHOD AND APPARATUS OF HARD DISK DRIVE

CROSS-REFERENCE TO RELATED APPLICATIONS

This application claims the benefit of Korean Patent Application No. 10-2009-0033314, filed on Apr. 16, 2009, in the Korean Intellectual Property Office, the disclosure of which is incorporated herein in its entirety by reference.

BACKGROUND

1. Field of the Invention

The present general inventive concept relates to a servo pattern erasing method and apparatus of a hard disk drive, and more particularly, to a servo pattern erasing method and apparatus of a hard disk drive which may not only uniformly erase a servo pattern recorded on a disk but skip the time to stabilize a read/write head after position control of the read/write head needed when a servo writer is used, thus reducing a time to erase the servo pattern.

2. Description of the Related Art

Hard disk drives (HDDs) are data storage devices capable of recording data on a disk or reproducing data stored on the disk using a read/write head. The HDD is widely used as an auxiliary memory device for computer systems because of its fast access time to a large amount of data.

Before reading data from or writing data to an HDD, a servo pattern that is recorded on a servo track of a disk is read to obtain an accurate position. However, a defective servo track due to a servo track write defect or a disk defect generated in the manufacturing process of the HDD may exist. Since the defective servo track causes an error in the process of reading/writing data with respect to the disk, the defective servo track should be corrected.

To correct a disk having a defective servo track, the defective servo track may be erased by using a magnet or by irregularly moving the read/write head over the disk, or the whole surface of the disk may be erased by using a servo writer. However, method disadvantage of erasing a defective servo track by using a magnet is that only one surface that may be accessed by the magnet may be erased due to a limited inner space of the HDD. Also, a disadvantage of erasing a defective servo track by irregularly moving a read/write head over the disk is that all servo patterns on a disk may not be uniformly erased and the read/write head irregularly moves rapidly over the disk so that the read/write head may be damaged. Also, method disadvantage of erasing the whole surface of a disk by using a servo writer is that the method takes a long time and an expensive precision position control actuator is needed.

Accordingly, there is a demand for a method of erasing a servo pattern which may uniformly erase the whole surface of a disk and simultaneously reduce the time to erase a servo pattern recorded in the defective servo track.

SUMMARY

The present general inventive concept provides a servo pattern erasing method and apparatus of a hard disk drive which may not only uniformly erase a servo pattern recorded on a disk but also does not require time to stabilize a read/write head after position control of the read/write head that is needed when a servo writer is used, thus reducing a time to erase the servo pattern.

Additional features and utilities of the present general inventive concept will be set forth in part in the description which follows and, in part, will be obvious from the description, or may be learned by practice of the general inventive concept.

Features and/or utilities of the present general inventive concept may be realized by a method of erasing a servo pattern of a hard disk drive including reading a servo pattern recorded on a disk, generating an erase pattern to erase the servo pattern based on the servo pattern obtained in the reading of the servo pattern, and erasing the servo pattern by using the erase pattern while the disk is rotated.

In the erasing of the servo pattern, a read/write head to read the servo pattern may be moved substantially at a constant speed in a radial direction of the disk to erase half of a track of the servo pattern per one turn of the disk.

The erasing of the servo pattern may be continuously performed until an actuator arm where the read/write head is provided reaches a limit stop.

The servo pattern may be a four-burst pattern formed in the same interval, and the erase pattern may be formed in the same interval to correspond to a cycle of the four-burst pattern.

The erase pattern may be formed to allow an erase signal to be generated only in a portion where the four-burst pattern is formed.

The servo pattern may be a spiral pattern that is formed in the same interval, and the erase pattern may be formed in the same interval to correspond to a cycle of the spiral pattern.

The erase pattern may be formed to allow an erase signal to be generated only in a portion where the spiral pattern is formed.

The method may be performed in an on-drive state in which the disk is installed in the hard disk drive.

Features and/or utilities of the present general inventive concept may also be realized by an apparatus to erase a servo pattern of a hard disk drive including a mechanical press pin having one end attached to an actuator arm of the hard disk drive and the other end exposed outside the hard disk drive, a first pulley coupled to the other end of the mechanical press pin, a motor to rotate the first pulley, and a drive belt connecting the first pulley and the motor.

The apparatus may further include a motor controller to control a rotation speed of the motor to move a read/write head coupled to the actuator as long as half of a track substantially at a constant speed in a radial direction of the disk when a disk provided in the hard disk drive rotates one turn.

The other end of the mechanical press pin may be exposed outside the hard disk drive through a slot. The apparatus may further include a second pulley connected to the first pulley via the drive belt and having a size smaller than the first pulley.

Features and/or utilities of the present general inventive concept may also be realized by a method of erasing a servo pattern on a disk including reading a servo pattern of a disk, generating an erase pattern to correspond to the servo pattern of the disk, and erasing the servo pattern of the disk according to the erase pattern.

Reading a servo pattern of the disk may include reading only a portion of the disk to determine the servo pattern of the entire disk.

Generating the erase pattern may include generating an erase pattern having erase signals that have a signal length greater than a length of a waveform of a corresponding servo pattern.

The generated erase pattern may include turning off an erase signal to correspond to portions of the disk that do not may include the servo pattern.

The erase signal may be turned off during user data-storage portions of the disk.

Erasing the servo pattern may include moving a read/write head at a substantially constant speed in a substantially radial direction of the disk. The read/write head may move across substantially one half of one track with each complete rotation of the disk.

Features and/or utilities of the present general inventive concept may also be realized by an apparatus to erase a servo pattern of a disk in a hard disk drive (HDD) including a read/write head to read data from, write data to, and erase data from a disk, an actuator arm to move the read/write head over the disk, and a mechanical press pin connected to the actuator arm and having one end located externally to the HDD to control the actuator arm to move the read/write head over a surface of the disk.

The apparatus may further include a first pulley connected to the mechanical press pin, a second pulley connected to the first pulley via a belt, and a motor connected to the second pulley to control movement of the actuator arm via the second pulley, the belt, the first pulley, and the mechanical press pin.

The first pulley may have a diameter larger than the second pulley.

The HDD further may include a pivot shaft, a bobbin connected to the actuator arm and located on an opposite side of the pivot shaft with respect to the actuator arm. The bobbin and the actuator arm may rotate about the pivot shaft, and the mechanical press pin may be connected to the pivot shaft.

The HDD further may include a voice coil motor to control a position of the bobbin, to thereby control movement of the actuator arm in a read/write operation.

Features and/or utilities of the present general inventive concept may also be realized by a computing device including a hard disk drive (HDD) including a disk, a read/write head to transmit data to and from the disk, a head stack assembly (HSA) on which the read/write head is mounted to move the read/write head over the disk, and a first motor to control movement of the HSA over the disk, and an erase pattern generator to detect a servo pattern read by the read/write head and to generate an erase pattern to control the read/write head to erase the detected servo pattern according to the generated erase pattern.

The computing device may further include a mechanical press pin connected to the HSA and having one end located externally to the HDD to control the HSA to move the read/write head over a surface of the disk, a first pulley connected to the mechanical press pin, a second pulley connected to the first pulley via a belt, and a second motor connected to the second pulley to control movement of the actuator arm via the second pulley, the belt, the first pulley, and the mechanical press pin.

The computing device may further include an HDD controller to control read/write operations of the read/write head and a position of the HSA over the disk, and the HDD controller controls the position of the HSA with the first motor during a read/write operation and with the second motor during a servo pattern erase operation.

BRIEF DESCRIPTION OF THE DRAWINGS

Exemplary embodiments of the present general inventive concept will be more clearly understood from the following detailed description taken in conjunction with the accompanying drawings in which:

FIG. 3 illustrates the data format of a track in the HDD of FIG. 1;

DETAILED DESCRIPTION OF THE EMBODIMENTS

Figure 1:
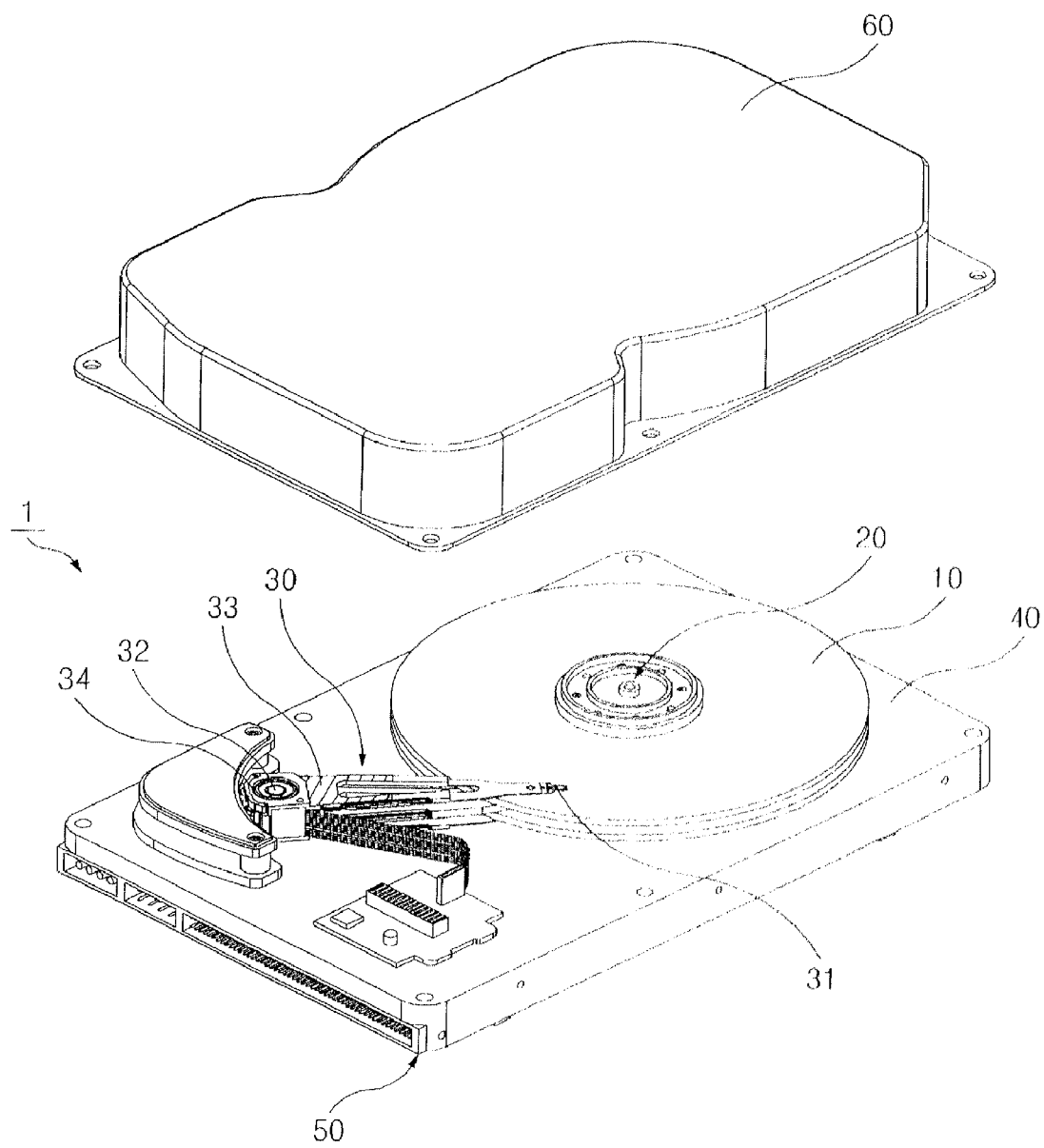
FIG. 1 is a partially exploded perspective view of an HDD employing a method of erasing a servo pattern of an HDD according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a partially exploded perspective view of a hard disk drive (HDD) 1 employing a method of erasing a servo pattern of an HDD according to an exemplary embodiment of the present general inventive concept. Referring to FIG. 1, the HDD 1 includes a disk 10, a spindle motor 20 to support and rotate the disk 10, a head stack assembly (HSA) 30 to record data onto the disk 10 or reading data from the disk 10, a base 40 on which the disk 10 and HSA 30 are mounted, a printed circuit board assembly (PCBA) 50, on which circuit parts are installed, coupled to a lower portion of the base 40 to control various elements, and a cover 60.

The HSA 30 includes a read/write head 31 to write data to the disk 10 or read the written data, an actuator arm 33 to pivot across a surface of the disk 10 around a pivot shaft 32 to allow the read/write head 31 to access data on the disk 10, a pivot shaft holder 34 rotatably supporting the pivot shaft 32 and supporting the actuator arm 33 that is coupled thereto, and a bobbin (not shown) provided at the opposite side of the actuator arm 33 with respect to the pivot shaft holder 34 and having a voice coil wound therearound and located between magnets of a voice coil motor (VCM).

Figure 2A:
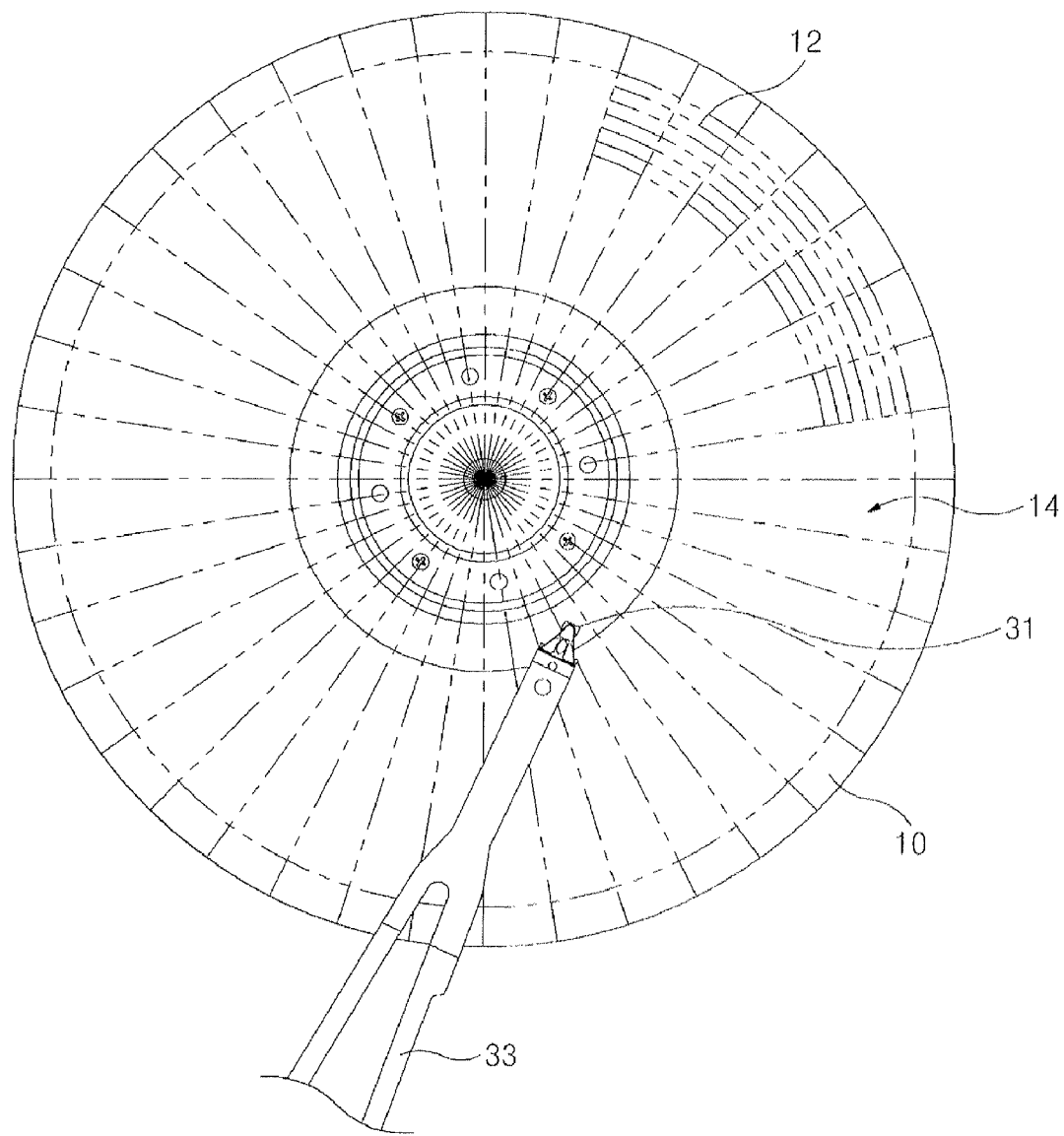
FIGS. 2A and 2B are plan views schematically illustrating a disk area of the HDD of FIG. 1.
Figure 2B:
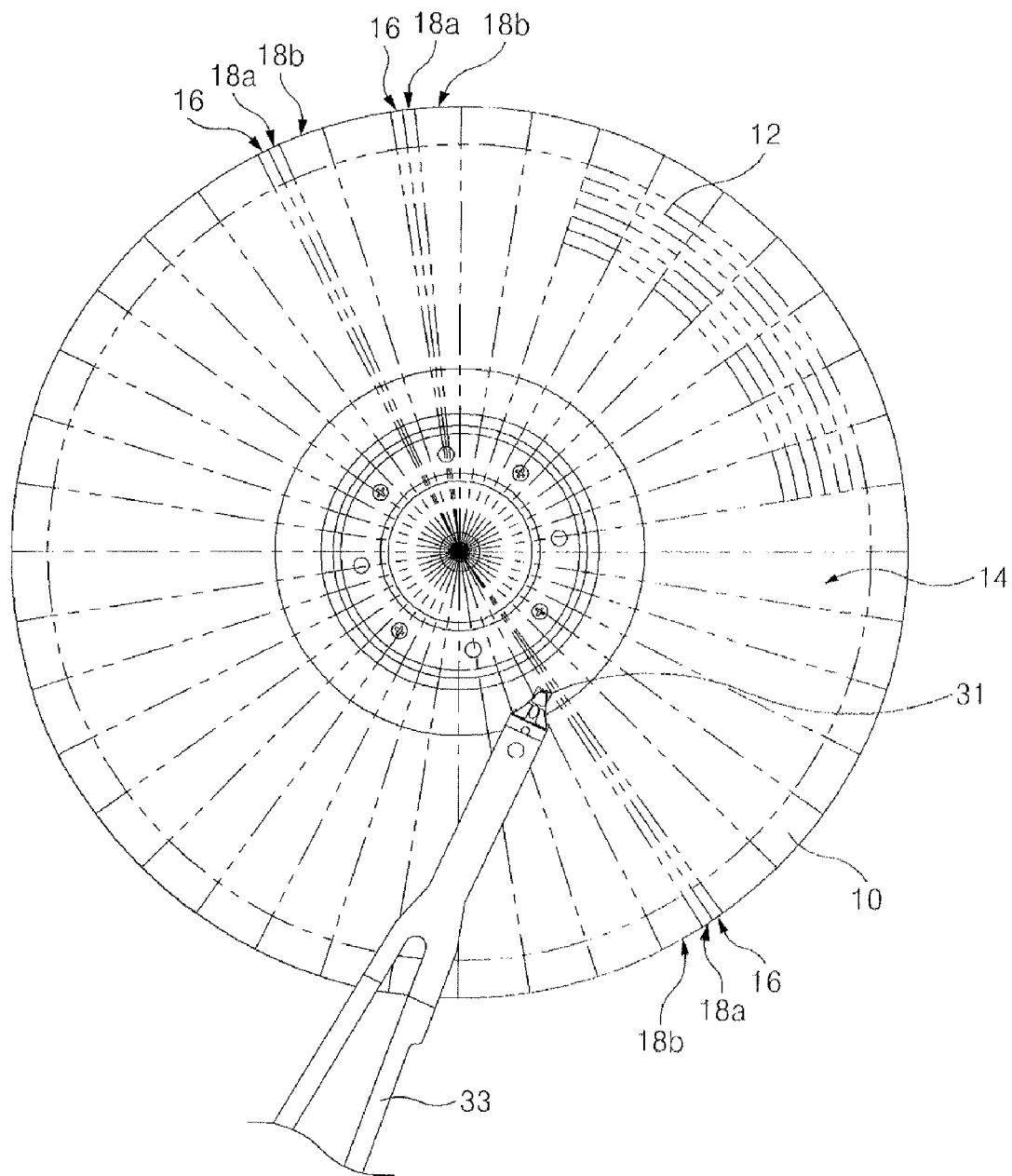
Figure 4:
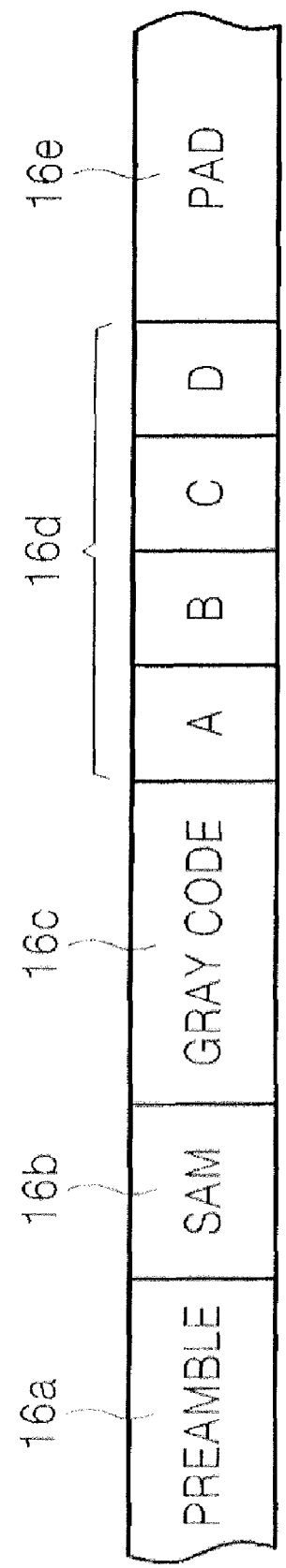
FIG. 4 illustrates the detailed structure of the servo sector of FIG. 3.

FIGS. 2A and 2B are plan views schematically illustrating a disk area of the HDD 1 of FIG. 1. FIG. 3 illustrates the data format of a track in the HDD 1 of FIG. 1. FIG. 4 illustrates the detailed structure of a servo sector 16 of FIG. 3.

Referring to FIGS. 2A and 2B, the disk 10 may be divided into tracks 12 where servo information and data information are stored, and sectors 14, which may be formed by equiangularly dividing the tracks 12 with respect to a rotation center. As illustrated in FIGS. 2B and 3, the different sectors 14 of a track 12, or different portions of the sectors 14, may correspond to different functions. For example, one or more sectors 14, or a portion of a sector 14, may be dedicated to a servo sector 16 for servo control such as track seeking and track following. Other sectors 14, or other portions of the sector 14, may be dedicated to an ID field 18a and a data field 18b. Although the ID field 18a and the data field 18b may span multiple sector divisions 14, the ID field 18a and the data field 18b are referred to as a data sector 18. The ID field 18a may store header data to identify the data field 18b, and the data field 18b may store user data.

Figure 8:
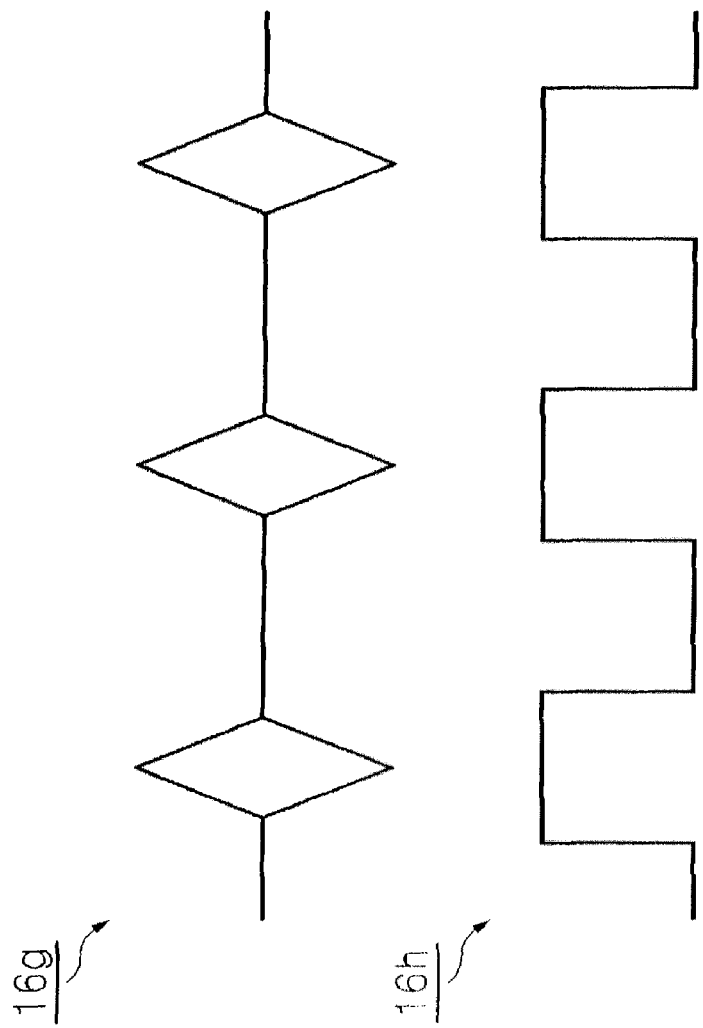
FIG. 8 schematically illustrates a spiral pattern obtained according to the operation of reading a servo pattern in FIG. 5 and an erase pattern generated based on the spiral pattern.

The servo sector 16, as illustrated in FIG. 4, includes a preamble 16a, a servo address mark (SAM) 16b, a gray code 16c, bursts A, B, C, and C 16d, and a PAD 16e. Although FIG. 4 illustrates bursts A, B, C, and C 16d corresponding to the four-burst pattern 16f illustrated in FIG. 6, according to another exemplary embodiment the servo pattern may be a spiral pattern 16g as illustrated in FIG. 8. Since the four-burst pattern 16f and the spiral pattern 16g are substantially the same in the method of erasing a servo pattern according to the present exemplary embodiment, they are described together in the following description.

The preamble 16a is referred to as a servo sync and provides a clock sync during reading the servo information and simultaneously provides a gap to the front of the servo sector to indicate a beginning the servo sector. The servo address mark 16b provides a sync to indicate the start of the servo data and points to the gray code 16c that follows. That is, the SAM 16b is provided as a reference point to generate various timing pulses related to servo control. The gray code 16c provides information about the track 12. The bursts A, B, C, and D 16d provide a position error signal (PES) that is required to seek and follow a track 12. Most of the bursts A, B, C, and D 16d are written directly by the read/write head 31 in the HDD 1, except for a seed servo pattern that may be written in a manufacturing process or other pre-end-user process. Finally, the PAD 16e provides a transition margin from the servo sector 16 to the data sector 18.

The data sector 18 is located before and after of the servo sector 16 and is divided into an ID field 18a and a data field 18b, as described previously.

Figure 5:
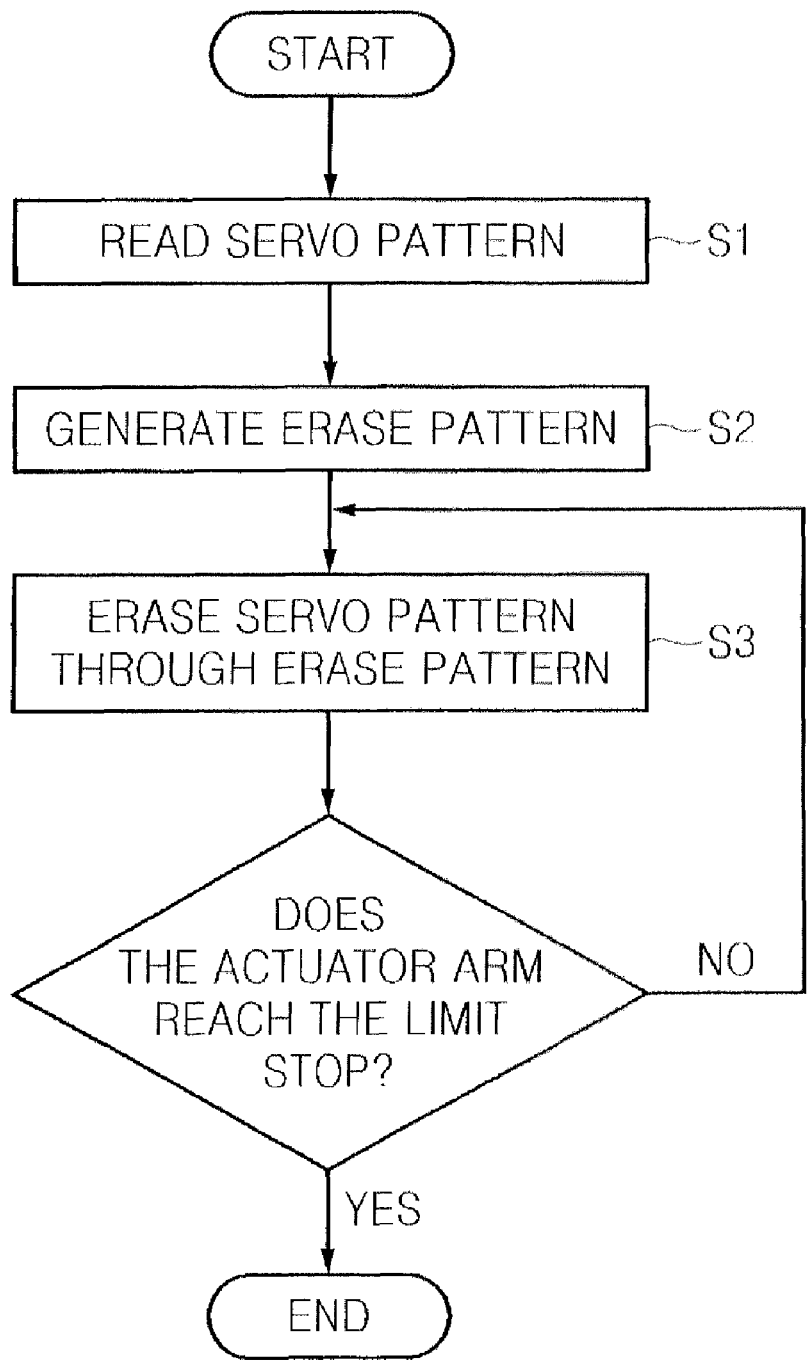
FIG. 5 is a flowchart for explaining a method of erasing a servo pattern of an HDD according to an exemplary embodiment of the present general inventive concept.
Figure 6:
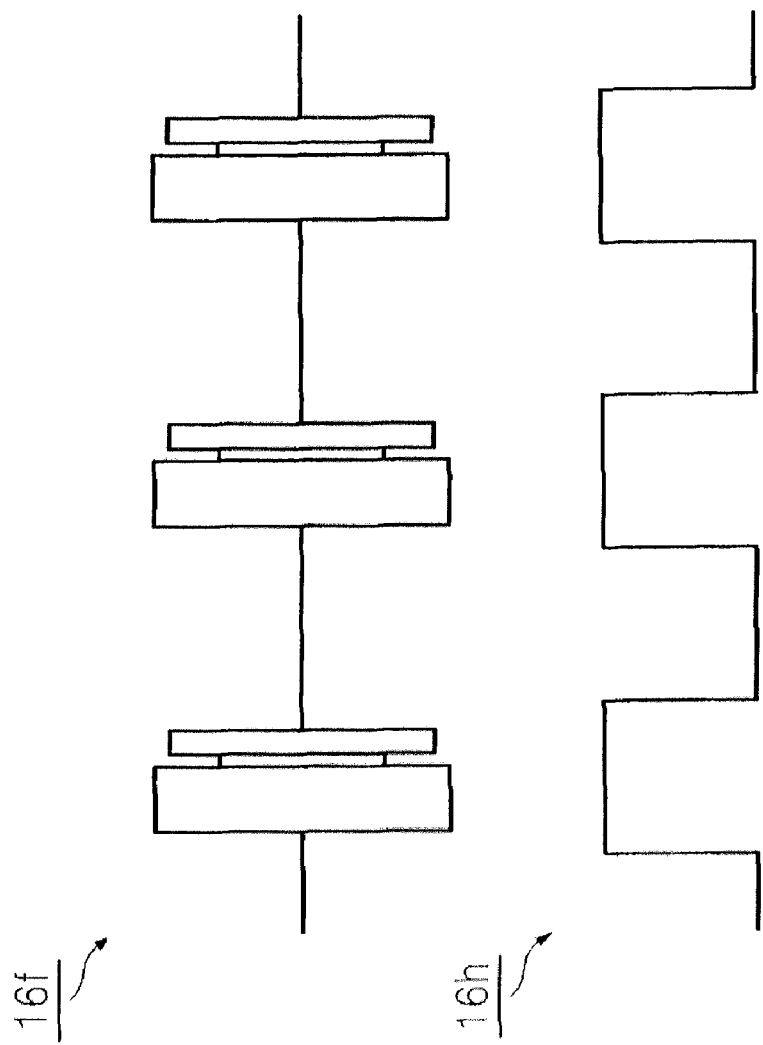
FIG. 6 schematically illustrates a 4 burst pattern obtained according to the operation of reading a servo pattern in FIG. 5 and an erase pattern generated based on the four-burst pattern.
Figure 7:
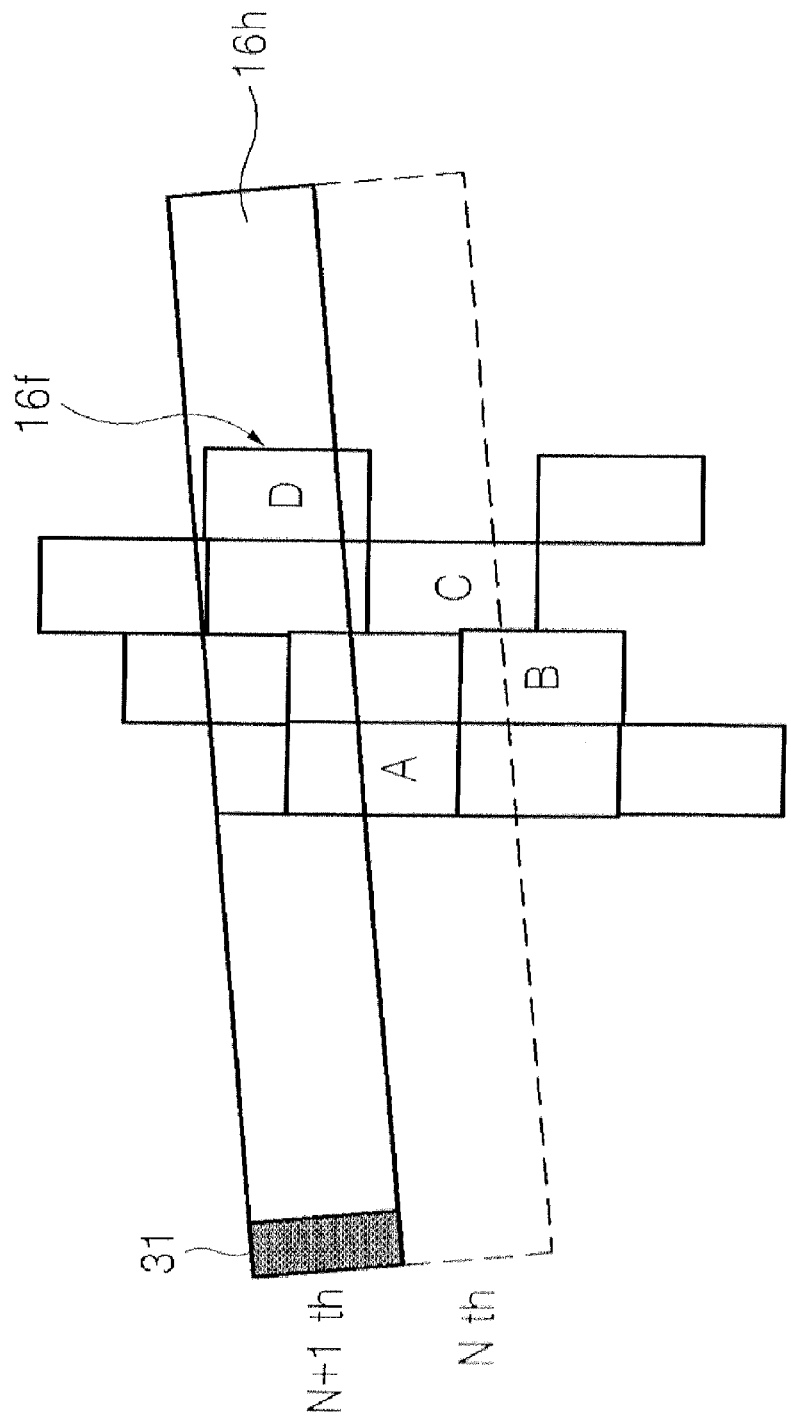
FIG. 7 schematically illustrates the principle of the operation of erasing the four-burst pattern of FIG. 5.
Figure 9:
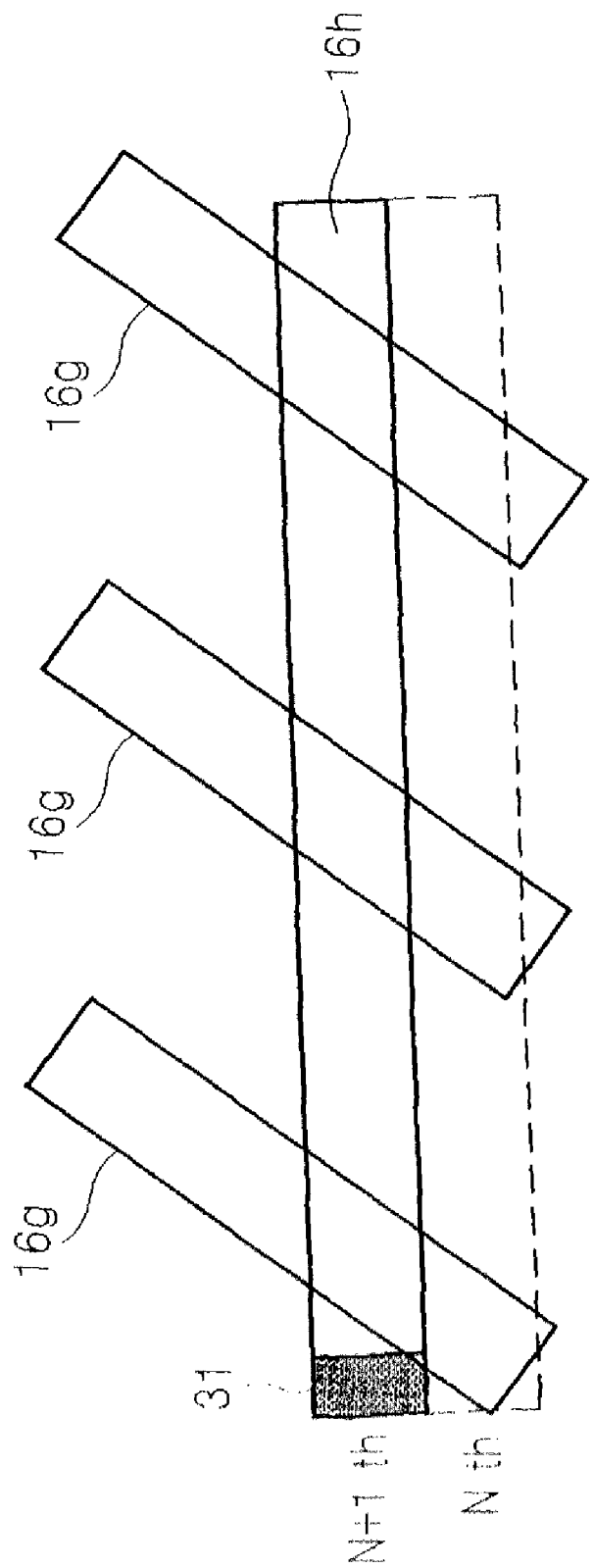
FIG. 9 schematically illustrates the principle of the operation of erasing the spiral pattern of FIG. 8.

FIG. 5 is a flowchart to illustrate a method of erasing a servo pattern of an HDD according to an exemplary embodiment of the present general inventive concept. FIG. 6 schematically illustrates a four-burst pattern obtained according to the operation of reading a servo pattern in FIG. 5 and an erase pattern generated based on the four-burst pattern. FIG. 7 schematically illustrates the principle of the operation of erasing the four-burst pattern of FIG. 5. FIG. 8 schematically illustrates a spiral pattern obtained according to the operation of reading a servo pattern in FIG. 5 and an erase pattern generated based on the spiral pattern. FIG. 9 schematically illustrates the principle of the operation of erasing the spiral pattern of FIG. 8.

Referring to FIGS. 5-9, the method of erasing a servo pattern according to the present exemplary embodiment includes the operations of reading a servo pattern recorded on a disk (S1), generating an erase pattern to erase the servo pattern (S2), and erasing the servo pattern through the erase pattern (S3).

In the reading of a servo pattern recorded on a disk (S1), a servo pattern recorded in the servo sector 16 of the disk 10 is read by the read/write head 31. The read/write head 31 reads the servo pattern recorded in the servo sector 16 through the preamble 16a formed in the servo sector 16. Since the servo pattern has a wavelength repeated at a predetermined cycle, the overall wavelength of the servo pattern may be obtained without reading the whole of the disk 10.

When the servo pattern recorded on the disk 10 is the four-burst pattern 16f, the servo pattern read by the read/write head 31 generates a waveform as illustrated in FIG. 6. When the servo pattern recorded on the disk 10 is the spiral pattern 16g, the servo pattern read by the read/write head 31 generates a waveform as illustrated in FIG. 8.

In the generating of an erase pattern to erase the servo pattern (S2), an erase pattern 16h to erase the servo pattern is generated based on the servo pattern obtained in the operation S1. The erase pattern 16h is formed to be a slightly larger than the area of the servo pattern based on the size of the area where the servo pattern is formed. The erase pattern 16h generates an erase signal at a starting point of the servo pattern and transfers the erase signal to the read/write head 31. At the end point of the servo pattern, the erase signal is not generated so that load applied to the read/write head 31 may be minimized. The erase signal may be generated from a preamplifier (not shown) provided in the HDD 1 and transferred to the read/write head 31.

The erase pattern 16h may be generated to have the same cycle as the cycle of the servo pattern on the disk 10. Accordingly, the erase pattern 16h may be easily generated without reading the servo pattern formed over the entire disk 10.

Since the number of four-burst patterns 16f on the disk may be as many as the number of sectors of the disk 10, and since the number of spiral patterns 16g on the disk may be as many as a multiple of the number of sectors of the disk 10, the erase pattern 16h has a larger width when the servo pattern is the four-burst patterns 16f than when the servo pattern is the spiral pattern 16g.

In the erasing of the servo pattern through the erase pattern (S3), all servo patterns on the disk 10 are erased through the erase pattern 16h generated in the operation S2 while the disk 10 rotates. The read/write head 31 of the HDD 1 moves at a constant speed in a radial direction of the disk 10 to erase half of a track of the servo pattern per one turn of the disk 10. Accordingly, an erase path of the servo pattern erased by the erase pattern 16h forms a single spiral path.

Figure 11:
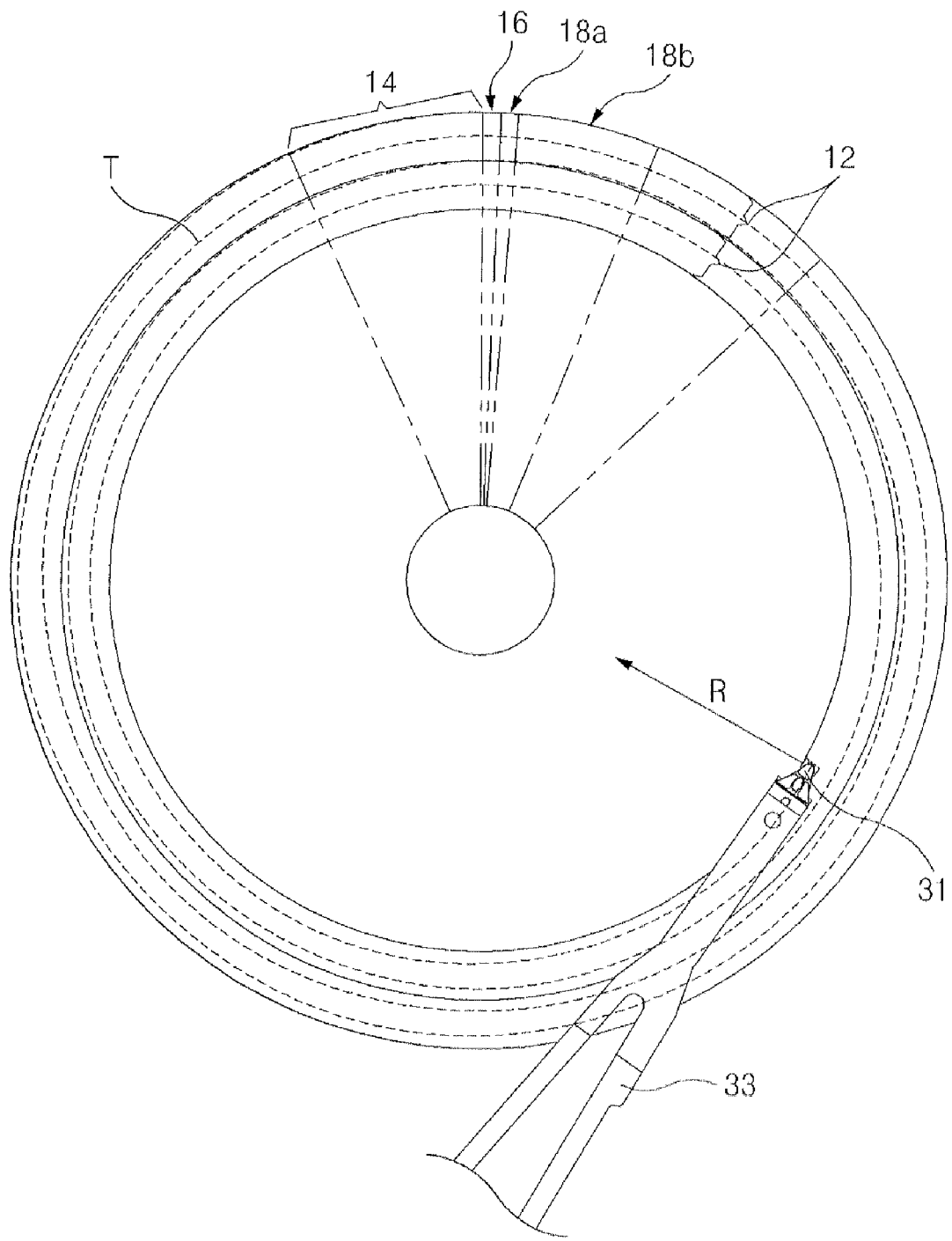
FIG. 11 is a plan view illustrating an erase path of a read/write head on a disk according to an embodiment of the present general inventive concept.

FIG. 11 illustrates an erase pattern of the read/write head 31 with respect to the disk 10. The disk 10 has a similar structure as the disk 10 illustrated in FIGS. 2A and 2B, for example. The size of the tracks 12 is exaggerated for purposes of illustration. As the disk 10 rotates, the read/write head 31 at the end of the actuator arm 33 moves in a direction R that is substantially a radial direction of the disk 10. The path T formed by the read/write head 31 is a spiral shape so that the read/write head 31 erases about one half of each track 12 each time the disk 10 rotates one full turn.

When the servo pattern recorded on the disk 10 is the four-burst pattern 16f, the erase path is as illustrated in FIG. 7. When the servo pattern recorded on the disk 10 is the spiral pattern 16g, the erase path is as illustrated in FIG. 9.

While moving in the radial direction of the disk 10 at the cycle of the erase pattern 16h, the read/write head 31 erases one half of a track of the servo pattern where the spiral pattern or the four-burst pattern is formed at the N-th position. After the disk 10 rotates one turn, the read/write head 31 moving in the radial direction of the disk 10 erases the next half of the track of the servo pattern at the (N+1)th position. As described above, the erase signal supplied to the read/write head 31 is asserted only in a portion where the servo pattern is formed to erase the servo pattern, and the erase signal is not asserted in a portion of the disk 10 where the servo pattern is not formed, thus minimizing damage to the read/write head 31.

Since the erasing of the servo pattern through the erase pattern (S3) is continuously performed until the actuator arm 33 with the read/write head 31 reaches a limit stop (not shown), all servo patterns formed on the disk 10 may be erased. The limit stop is a limit of the movement of the actuator arm 33 in a direction toward the inner side of the disk 10 and signifies a position where the actuator arm 33 cannot be rotated further by a crash stop (not shown) provided on the HDD 1. That is, the crash stop is installed in the HDD 1, which contacts the rear end portion of the actuator arm 33 to prevent the actuator arm 33 from being rotated over a predetermined angle so that the read/write head 31 may be prevented from deviating from the disk track.

The four-burst pattern 16f and the spiral pattern 16g of FIGS. 7 and 9 are actual shapes of the patterns formed on the disk 10, and are substantially the same as the four-burst pattern 16f and the spiral pattern 16g of FIGS. 6 and 8 read by the read/write head 31.

Since the method of erasing a servo pattern of an HDD according to the present exemplary embodiment is performed in an on-drive state, that is, a state in which the disk 10 is installed in the HDD 1, the servo pattern recorded on the disk 10 may be easily erased. Also, according to the method of erasing a servo pattern of an HDD according to the present exemplary embodiment, not only the servo pattern recorded on the disk 10 may be uniformly erased, but a stabilization time to stabilize the read/write head 31 after the position control of the read/write head 31 is not needed, thereby reducing the time to erase a servo pattern.

Figure 10:
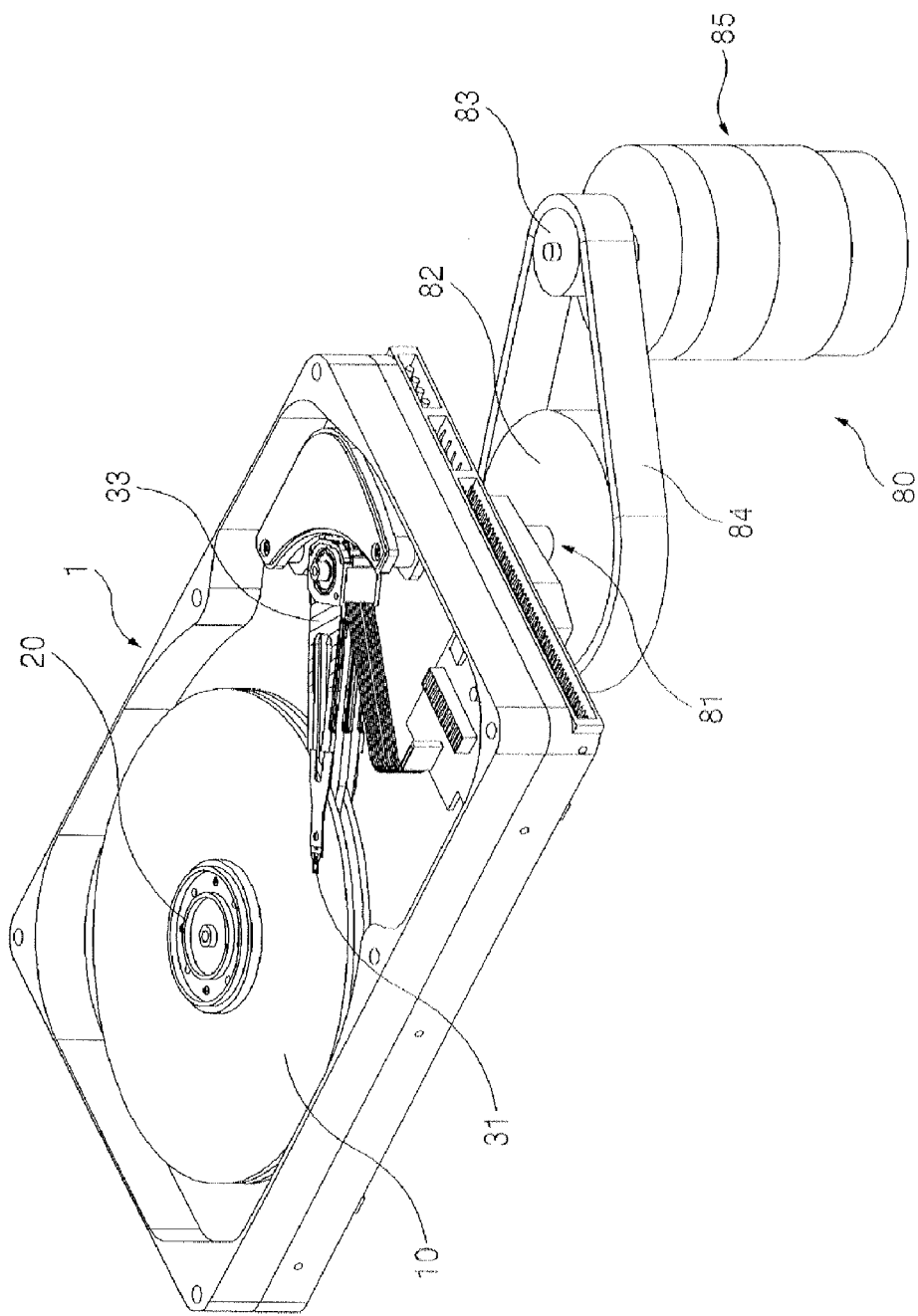
FIG. 10 is a perspective view schematically illustrating an apparatus to erase a servo pattern of an HDD according to an exemplary embodiment of the present general inventive concept.

FIG. 10 is a perspective view schematically illustrating an apparatus 80 to erase a servo pattern of an HDD according to an exemplary embodiment of the present inventive concept. The apparatus 80 includes a mechanical press pin 81 having one end attached to the actuator arm 33 of the HDD 1, a first pulley 82 coupled to the other end of the mechanical press pin 81, a motor 85 to rotate the first pulley 82, a second pulley 83 coupled to a drive shaft of the motor 85, and a drive belt 84 connected between the first pulley 82 and the second pulley 83.

One end of the mechanical press pin 81 is attached to the actuator arm 33 of the HDD 1, and the other end is exposed outside the HDD 1 through a slot (not shown). The mechanical press pin 81 is provided to rotate the actuator arm 33 according to the rotation of the first pulley 82 so that the read/write head 31 may be moved in the radial direction of the disk 10.

The first pulley 82 is connected to the second pulley 83 via the drive belt 84 to transfer a rotation force generated according to the rotation of the motor 85 to the mechanical press pin 81. The second pulley 83 transfers the rotation force generated according to the rotation of the motor 85 to the first pulley 82. In the present exemplary embodiment, the second pulley 83 is smaller than the first pulley 82 and accordingly the first pulley 82 rotates at a slower speed than the second pulley 83. That is, considering the difference in the size between the first and second pulleys 82 and 83, the apparatus 80 functions as a sort of decelerator to make the read/write head 31 of the HDD 1 move slowly compared to the rotation of the motor 85.

The motor 85 transfers the rotation force sequentially via the second pulley 83, the drive belt 84, and the first pulley 82 to rotate the actuator arm 33. The servo motor refers to a precision position control motor having its own encoder to correct an error by receiving precise feedback and driven at a pulse cycle.

The apparatus 80 to erase a servo pattern of an HDD according to the present exemplary embodiment may precisely control the rotation speed of the actuator arm 33 according to the motor 85 implemented by a servo motor. As a result, the read/write head 31 may be moved in the radial direction of the disk 10 at a constant speed.

The apparatus 80 further includes a motor controller (not shown) to control the rotation speed of the actuator arm 33. The motor controller is provided on the HDD 1 or separately from the HDD 1 and controls the rotation speed of the motor 85 to control the rotation speed of the actuator arm 33. That is, the read/write head 31 coupled to the actuator arm 33 under the control of the motor controller may be moved at a constant speed as long as half track in the radial direction of the disk 10 when the disk 10 of the HDD 1 rotates one turn.

The apparatus 80 to erase a servo pattern of an HDD according to the present exemplary embodiment may uniformly erase all servo patterns on the disk 10 while minimizing the damage to the read/write head 31, and also may erase the servo pattern without an expensive precision position control actuator. Also, the apparatus 80 does not require stabilization time to stabilize the read/write head 31 after the position control of the read/write head 31 needed when the servo writer is used, so that the time to erase a servo pattern on the disk 10 may be reduced.

Figure 12:
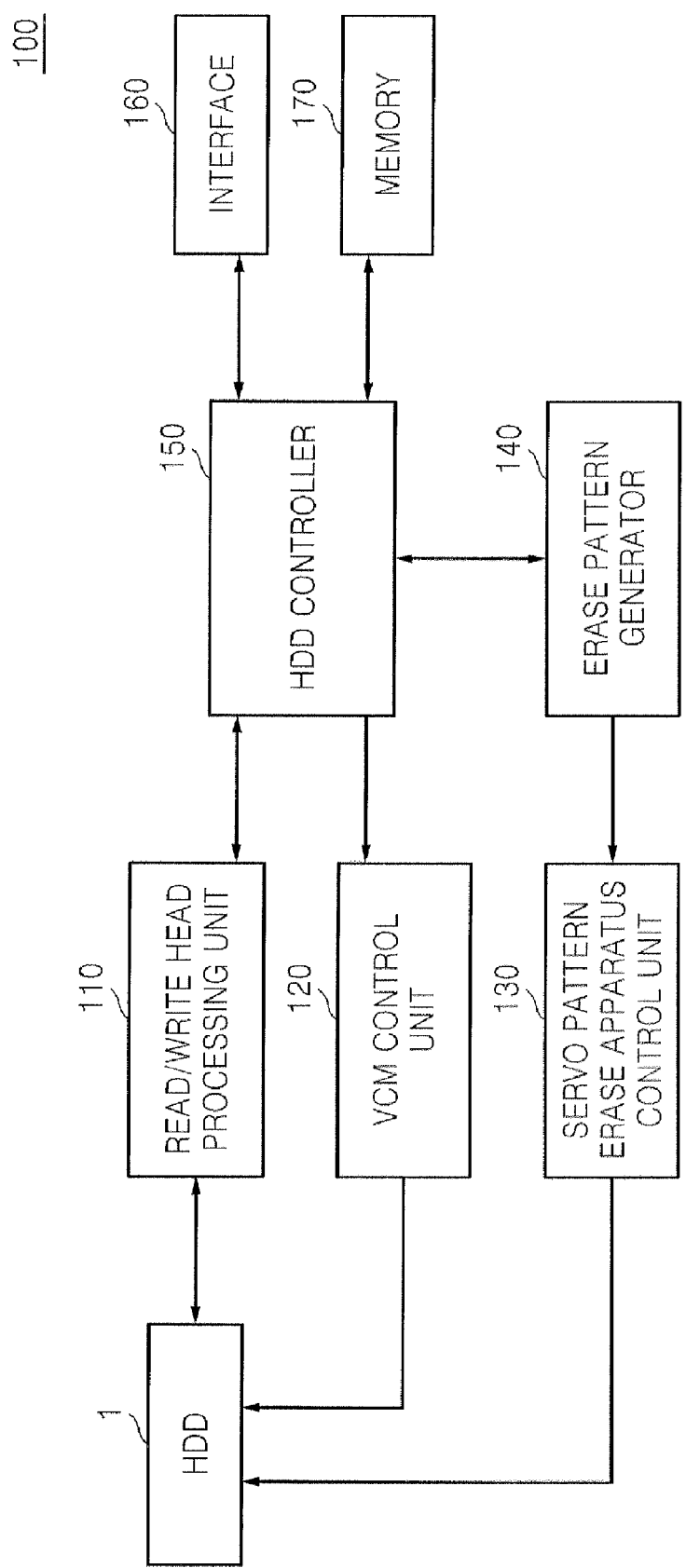
FIG. 12 illustrates a control system of a hard disk drive according to the present general inventive concept.

FIG. 12 illustrates a control system 100 to control an HDD 1 according to an embodiment of the present general inventive concept. The control system 100 may include the HDD 1, a read/write head processing unit 110 to control power supplied to the read/write head 31 and to receive data from the read/write head 31, a VCM control unit to control a position of the head stack assembly 30 by controlling the voice coil motor (not shown), and an HDD controller 150 to control read/write functions of the read/write head processing unit 110 and positioning of the VCM control unit 120.

The control system 100 may further include a servo pattern erase apparatus control unit 130 to control positioning of the actuator arm 33 by controlling the apparatus to erase the servo pattern 80, as illustrated in FIG. 10, for example. The control system 100 may also include an erase pattern generator 140 to generate an erase pattern to control positioning of the actuator arm 33 and output of an erase signal from the read/write head 31.

The control system 100 may further include an interface 160 to transmit data to and from an external device or a user, and memory 170 to store data to write to or data read from the HDD 1.

The erase pattern generator 140 and the servo pattern erase apparatus control unit 130 may include memory, processors, and other logic to generate an erase pattern and control the apparatus to erase the servo pattern 80. Alternatively, one or more of the erase pattern generator 140 and the servo pattern erase apparatus control unit 130 may include program code stored in memory and accessed by the HDD controller 150 to control operation of the read/write head 31 and the apparatus to erase the servo pattern 80.

The HDD controller 150 may include one or more processors, memory devices, and supporting logic devices to control read/write operations of the HDD 1 and erase operations of the HDD 1. The HDD controller 150 may receive instructions from the interface 160, for example, and may transmit data to and/or from memory 170, the interface 160, and the HDD 1.

The HDD controller 150 may be a controller for a computing device, such as a personal computer, server, portable computing device, such as a handheld device, imaging device, digital media storage and playback device, or any other computing device, or it may be a controller dedicated to operation of the HDD 1. The interface 160 may include one or more hard-wire ports, wireless transceivers, or user interface buttons, screens, or other devices to transmit data to and/or from the HDD controller 150. The memory 170 may include any type of memory including volatile and non-volatile memory.

As described above, according to the present inventive concept, since the servo pattern of an HDD is erased by using a trace of a single spiral, not only the servo pattern recorded on the HDD may be uniformly erased, but the stabilization time to stabilize the read/write head after the position control of the read/write head needed when a servo writer is used is not needed, thereby reducing the time to erase a servo pattern.

While the present general inventive concept has been particularly shown and described with reference to exemplary embodiments thereof, it will be understood that various changes in form and details may be made therein without departing from the spirit and scope of the following claims.

What is claimed is:

1. A method comprising:
reading a servo pattern recorded on a disk;
generating an erase pattern based on the servo pattern, wherein the erase pattern has erase signals of greater length than waveform length of the read servo pattern; and
erasing the servo pattern by using the erase pattern.

2. The method of claim 1, wherein, the erasing of the servo pattern further comprises moving a read/write head substantially at a constant speed in a radial direction of the disk.

3. The method of claim 2, wherein the erasing of the servo pattern is continuously performed until an actuator arm where the read/write head is provided reaches a limit stop.

4. The method of claim 1, wherein the servo pattern is a four-burst pattern formed to have a predetermined interval between instances of the four-burst pattern, and the erase pattern is formed to have the same interval to correspond to a cycle of the four-burst pattern.

5. The method of claim 4, wherein the erase pattern is formed to generate an erase signal only in a portion where the four-burst pattern is formed.

6. The method of claim 1, wherein the servo pattern is a spiral pattern that is formed to have a predetermined interval between instances of the spiral pattern, and the erase pattern is formed to have the same interval to correspond to a cycle of the spiral pattern.

7. The method of claim 6, wherein the erase pattern is formed to generate an erase signal only where the spiral pattern is formed.

8. An apparatus comprising:
a mechanical press pin having one end attached to an actuator arm of a hard disk drive and an other end exposed outside the hard disk drive;
a first pulley coupled to the other end of the mechanical press pin;
a motor to rotate the first pulley; and
a drive belt connecting the first pulley and the motor.

9. The apparatus of claim 8, further comprising a motor controller to control a rotation speed of the motor to move a read/write head coupled to the actuator as long as half of a track substantially at a constant speed in a radial direction of the disk when a disk provided in the hard disk drive rotates one turn.

10. The apparatus of claim 8, wherein the other end of the mechanical press pin is exposed outside the hard disk drive through a slot, the apparatus further comprising a second pulley connected to the first pulley via the drive belt and having a size smaller than the first pulley.

11. A method comprising:
generating an erase pattern to correspond to a servo pattern of a disk; and
erasing the servo pattern of the disk according to the erase pattern,
wherein the reading and erasing comprise reading and erasing using a structure comprising:
a mechanical press pin having one end attached to an actuator arm of the hard disk drive and the other end exposed outside the hard disk drive;
a first pulley coupled to the other end of the mechanical press pin;
a motor to rotate the first pulley; and
a drive belt connecting the first pulley and the motor.

12. The method of claim 11, wherein reading a servo pattern of the disk includes reading only a portion of the disk to determine the servo pattern of the entire disk.

13. The method of claim 11, wherein generating the erase pattern includes generating an erase pattern having erase signals that have a signal length greater than a length of a waveform of a corresponding servo pattern.

14. The method of claim 11, wherein the generated erase pattern includes turning off an erase signal to correspond to portions of the disk that do not include the servo pattern.

15. The method of claim 14, wherein the erase signal is turned off during user data-storage portions of the disk.

16. The method of claim 11, wherein erasing the servo pattern includes moving a read/write head at a substantially constant speed in a substantially radial direction of the disk.

17. The method of claim 16, wherein the read/write head moves across substantially a half of one track with each complete rotation of the disk.

18. A device comprising:
a hard disk drive (HDD) including a disk, a read/write head to transmit data to and from the disk, a head stack assembly (HSA) on which the read/write head is mounted to move the read/write head over the disk, and a first motor to control movement of the HSA over the disk;
wherein the hard disk drive comprises:
a mechanical press pin connected to the HSA and having one end located externally to the HDD to control the HSA to move the read/write head over a surface of the disk;
a first pulley connected to the mechanical press pin;
a second pulley connected to the first pulley via a belt; and
a second motor connected to the second pulley to control movement of the actuator arm via the second pulley, the belt, the first pulley, and the mechanical press pin.

19. The computing device according to claim 18, further comprising:
an HDD controller to control read/write operations of the read/write head and a position of the HSA over the disk, wherein the HDD controller controls the position of the HSA with the first motor during a read/write operation and with the second motor during a servo pattern erase operation.

20. An apparatus comprising:
a mechanical press pin having one end attached to an actuator arm of the hard disk drive and an other end exposed outside the hard disk drive;

a first pulley coupled to the other end of the mechanical press pin;
a first motor and a second motor to rotate the first pulley; and
a drive belt connecting the first pulley to the first motor and the second motor,
wherein during an erase operation the controller controls the first motor to move the read/write head at a constant speed over the disk and a second motor to rotate the disk at a constant speed.

* * * * *